May 11, 1965

T. L. BREMKAMP 3,182,893

PLASTIC FILM BREAD BAND

Filed Aug. 8, 1962

INVENTOR.
Terrance L. Bremkamp
BY
Stephen J. Rudy
att'ys.

May 11, 1965
T. L. BREMKAMP
3,182,893
PLASTIC FILM BREAD BAND
Filed Aug. 8, 1962
3 Sheets-Sheet 2
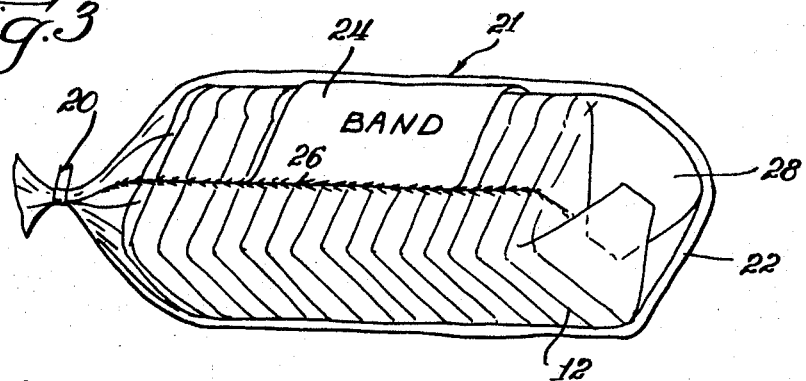
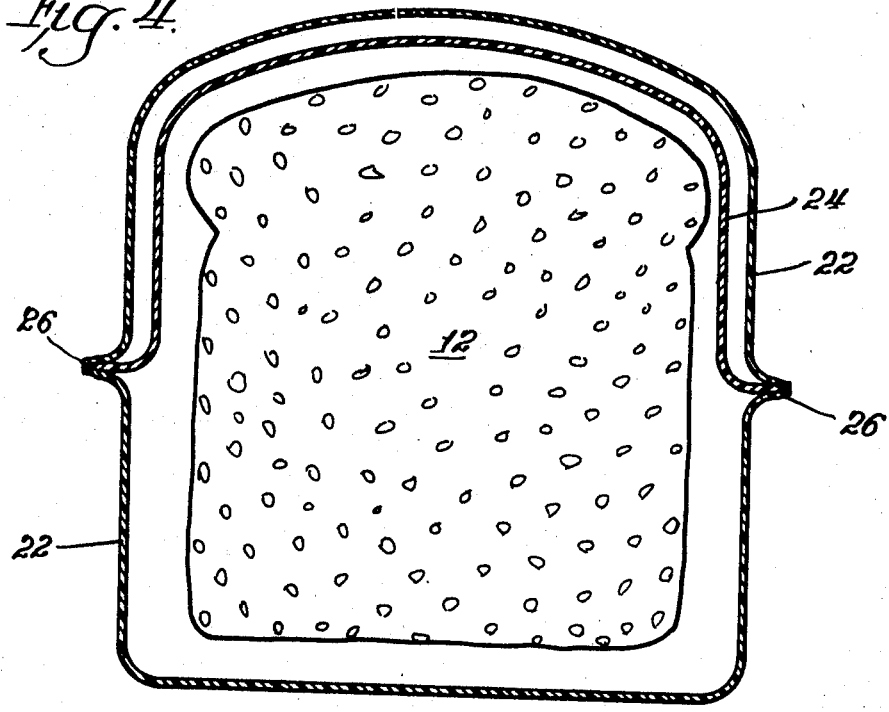
INVENTOR.
Terrance L. Bremkamp May 11, 1965     T. L. BREMKAMP     3,182,893
PLASTIC FILM BREAD BAND
Filed Aug. 8, 1962     3 Sheets-Sheet 3
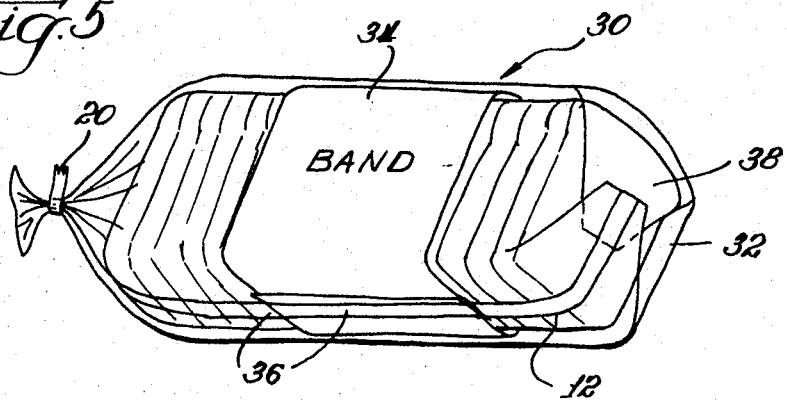
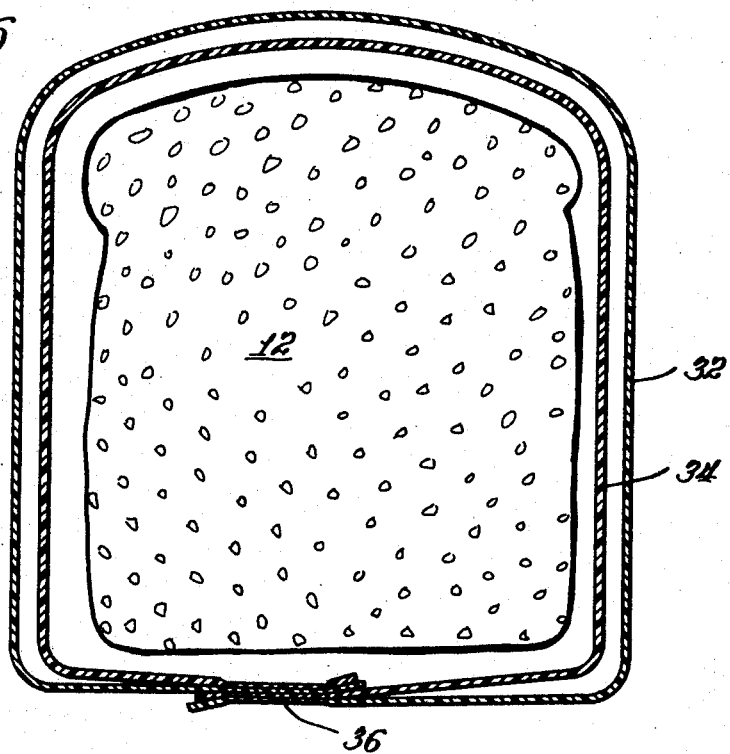
INVENTOR.
Terrance L. Bremkamp
BY Stephen J. Rudy
Att'ys

United States Patent Office 3,182,893
Patented May 11, 1965

3,182,893
PLASTIC FILM BREAD BAND
Terrance L. Bremkamp, Prospect Heights, Ill., assignor to The Dow Chemical Company, Midland, Mich., a corporation of Delaware
Filed Aug. 8, 1962, Ser. No. 215,732
4 Claims. (Cl. 229—87)

This invention relates to an improvement in a packaging arrangement and more particularly to the packaging of bread with plastic film wrappers including an inner plastic film band.

A type of bread packaging now being used utilizes an overwrap of plastic film with an inner band of wax paper or cellophane. One difficulty with such a packaging arrangement is that wax paper and cellophane readily absorb moisture, and frost at low temperatures. Consequently, such a packaging arrangement is unsatisfactory for frozen bread applications because of seal failure between the plastic overwrap and the wax paper or cellophane inner band.

The packaging arrangement of the subject invention avoids the shortcomings of such prior art arrangements. More particularly the inventive concept herein disclosed, will be seen to utilize a plastic film overwrap and a plastic film inner wrapper, or band, both of said elements being made of plastic heat sealable material, such as polyethylene or polypropylene. An arrangement of such nature not only allows bread wrapping operations on standard bread overwrapping machines using a trim seal, or a lap seal, but results in a package which is not affected by subzero environments, because of the moisture resistance of the plastic film material used.

Besides providing a package which affords use under extreme cold conditions, the invention offers a cost saving factor. On certain standard bread wrapping machinery, it is impossible to use a wax or cellophane band, therefore, it is necessary to purchase printed plastic overwrap material. The present invention allows use of plain overwrap plastic material and a narrow printed plastic band. Inventory problems are simplified because overwrap plastic material (normally 20" or more in width) can be stocked in large quantities while the plastic inner web or band material (normally 6" to 8" in width) can be stocked in smaller, easier to inventory, quantities. It will be found that the method of the present invention, results in a savings of 6 to 18% per loaf of bread.

The main object of this invention is to provide an improvement in a packaging arrangement.

A more specific object is to provide an improvement in a bread packaging arrangement whereby the package can withstand extremely cold temperatures without sealing failure.

Another object is to provide a packaging arrangement which allows bread wrapping operations utilizing an all plastic inner and outer wrapper to be performed on standard bread wrapping machines.

Still another object is to provide a packaging arrangement for bread which results in simplification of inventory problems, and provides a savings in unit cost.

These and further objects and features of the invention will become more apparent from the following description and accompanying drawings wherein:

FIG. 3 is a perspective-like view of a loaf of bread enclosed in a wrapper illustrative of a second embodiment of the invention;

FIG. 4 is an enlarged vertical section view taken at the mid-region of the package of FIG. 2;

FIG. 5 is a perspective-like view of a loaf of bread enclosed in a wrapper illustrative of a third embodiment of the invention; and FIG. 6 is an enlarged vertical section view taken at the mid-region of the package of FIG. 5.

Figure 1:
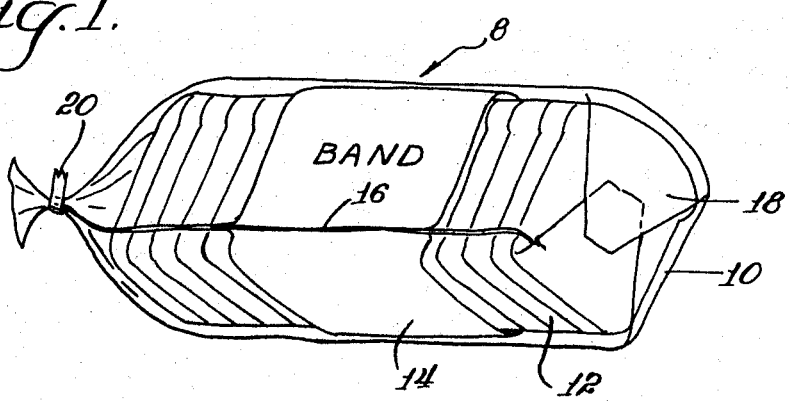
FIG. 1 is a perspective-like view of a loaf of bread enclosed in a wrapper embodying the principles of the invention.
Figure 2:
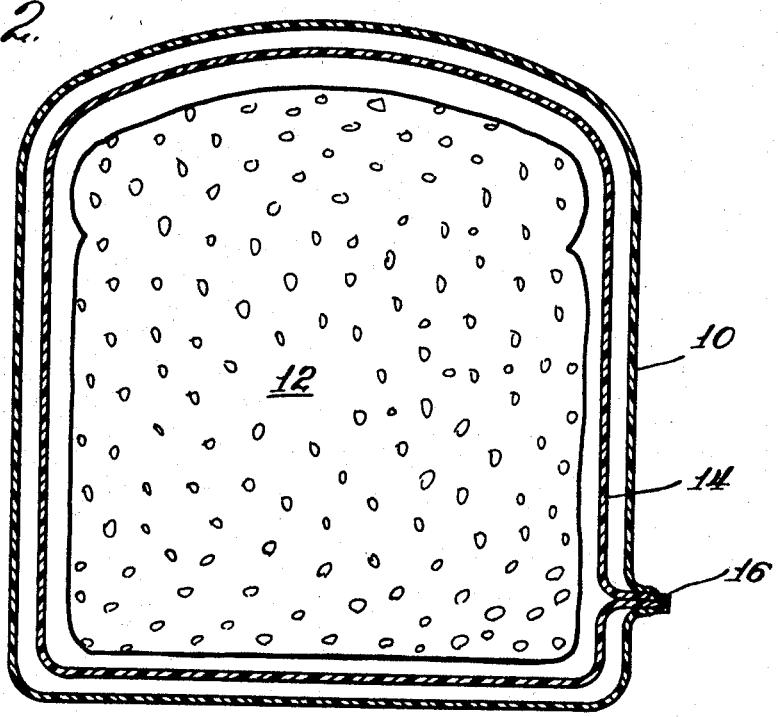
FIG. 2 is an enlarged vertical section view taken at the mid-region of the package of FIG. 1.

Referring now to the drawings and more particularly to FIGS. 1 and 2, numeral 8 identifies a packaged loaf of bread having a wrapper arrangement illustrative of an embodiment of the invention. The wrapper arrangement includes a plastic film outer wrapper, or overwrap 10, which forms a bag enclosure for a loaf of sliced bread 12, and an inner plastic film wrapper, or band 14, which may have printed matter (i.e., brand name, producer, advertising material, etc.) thereupon. The band 14 may be of less width than the width of the overwrap. The material of the overwrap 10, and the band 14, is preferably of a heat sealable type, such as polyethylene or polypropylene, and is trim sealed (i.e., sealed and cut off in same operation) together along a longitudinal line 16 extending along a side of the package to form a tubular element. End folds 18 of the overwrap are heat sealed to enclose one end of the package, while the opposite end may be likewise folded and sealed, or preferably tied with an easily removable gummed tape 20, as shown.

The machinery for forming the package 8, i.e., wrapping, sealing and associated operations, is not shown, but may be of the type well known to those working with, or skilled in the art, as a Schjeldahl Bread Overwrap Machine.

In the modified embodiment shown in FIGS. 3 and 4, a packaged loaf of bread 21 has a wrapper arrangement including a plastic film overwrap 22, and an inner plastic film band 24, with printed matter, both preferably made of a heat sealable material, such as polyethylene or polypropylene. The overwrap 22 and the band 24 are trim sealed together along longitudinal lines 26 extending along opposite sides of the package to form, in effect, a tubular enclosure. End folds 28 of the overwrap are heat sealed to enclose one end of the package, while the opposite end may be likewise folded and sealed, or preferably tied with easily removable gummed tape 20.

Machinery for formation of the package 20, is not shown, but may be of the type known to those working with, or skilled in the art, as an F.M.C. Simplex Bread Bagger.

In the modified embodiment shown in FIGS. 5 and 6, a packaged loaf of bread 30 has a wrapper arrangement including a plastic film overwrap 32, and an inner plastic film band 34, with printed matter, both preferably made of a heat sealable material, such as polyethylene or polypropylene. The overwrap 32 and the band 34 are lap sealed along a longitudinal line 36 at the bottom of the loaf, to form, in effect, a tubular enclosure. End folds 38 of the overwrap are heat sealed to enclose one end of the package, while the opposite end may be likewise folded and sealed, or preferably tied with easily removable gummed tape 20.

While machinery for formation of the package 30 has not been shown, such may be of the type known to those working with or skilled in the art as the Package Machinery Co. National B. W. Bread Wrapper.

It is to be understood that while the inventive concept has been illustrated as applied to packaging of loaves of bread, other food products or diverse items, may be packaged with equal benefit derived from application of the principles of the invention. It is pointed out that while all three embodiments show the band on the inside of the wrapper, in certain cases it may be desirable to have the band on the outside of the wrapper. In the latter case, the principles of the invention will apply with equal effect.

The foregoing description has been given in detail without thought of limitation since the inventive principles involved are capable of assuming other forms without departing from the spirit of the invention or the scope of the following claims.

What is claimed is:

1. A packaging arrangement especially adapted for wrapping bread and the like on standard wrapping machines, comprising an outer plastic film wrapper and an inner plastic film band, a heat seal between said outer wrapper and said inner band along at least one longitudinal line to form a tubular element whereby the inner band is secured to said outer wrapper, and at least one end fold and seal at one extremity of said formed tubular element to provide an end closure.

2. The packaging arrangement of claim 1 wherein said heat seal is along two opposite lines on said tubular element and comprises a trim seal.

3. The packaging arrangement of claim 1 wherein said heat seal is along one longitudinal line and comprises a lap seal.

4. A packaging arrangement especially adapted for wrapping bread and the like on standard wrapping machines, comprising an outer plastic film wrapper and an inner plastic film band, a heat seal between said outer wrapper and said inner band along at least one longitudinal line to form a tubular element whereby the inner band is secured to said outer wrapper, and at least one end fold and seal at one extremity of said formed tubular element to provide an end closure, and tied at the opposite extremity of said tubular element with a removable tying means.

References Cited by the Examiner

UNITED STATES PATENTS

| 1,081,945 | 12/13 | Bitter | 99—172 |
| 1,580,064 | 4/26 | Martin | 99—172 |
| 1,994,507 | 3/35 | Farris. | |
| 2,286,307 | 6/42 | Replogle | 229—87 |
| 2,328,688 | 9/43 | Sheerin | 229—87 |
| 2,554,157 | 5/51 | Snyder | 229—55 |
| 2,692,723 | 10/54 | Elsman | 229—87 |
| 2,849,171 | 8/58 | O'Brien | 229—63 |
| 3,066,848 | 12/62 | Billeb | 229—87 |
| 3,132,028 | 5/64 | Austin et al. | 229—87 |

FRANKLIN T. GARRETT, *Primary Examiner.*